US007157843B2

(12) United States Patent
Ito et al.

(10) Patent No.: US 7,157,843 B2
(45) Date of Patent: Jan. 2, 2007

(54) TRANSFER FILM, METHOD FOR FORMING METAL BACK LAYER, AND DISPLAY DEVICE

(75) Inventors: Takeo Ito, Kumagaya (JP); Hajime Tanaka, Fujioka (JP); Tomoko Nakazawa, Maebashi (JP); Taichiro Nakayama, Kyoto (JP); Takaaki Shinohara, Kyoto (JP); Yoichiro Nakayama, Kyoto (JP); Kazuo Sakai, Kawanishi (JP)

(73) Assignees: Kabushiki Kaisha Toshiba, Tokyo (JP); Nikka Techno, Inc., Kyoto (JP); Fuji Pigment Co., Ltd., Kawanishi (JP)

( * ) Notice: Subject to any disclaimer, the term of this patent is extended or adjusted under 35 U.S.C. 154(b) by 43 days.

(21) Appl. No.: 10/979,112

(22) Filed: Nov. 3, 2004

(65) Prior Publication Data

US 2005/0062394 A1 Mar. 24, 2005

Related U.S. Application Data

(62) Division of application No. 10/181,446, filed as application No. PCT/JP01/00744 on Feb. 2, 2001, now Pat. No. 6,841,926.

(30) Foreign Application Priority Data

Feb. 3, 2000 (JP) ............................ 2000-026476

(51) Int. Cl.
*H01J 29/10* (2006.01)
*H01J 9/00* (2006.01)
*B32B 33/00* (2006.01)

(52) U.S. Cl. ..................... 313/461; 445/23; 428/32.63; 428/41.8

(58) Field of Classification Search ................ 313/446, 313/473, 479, 495, 461; 445/24, 23; 428/326, 428/336, 458, 461, 462, 463, 32.63, 41.8
See application file for complete search history.

(56) References Cited

U.S. PATENT DOCUMENTS

| | | | | |
|---|---|---|---|---|
| 5,141,461 | A | 8/1992 | Nishimura et al. | |
| 5,439,729 | A | 8/1995 | Kawakami et al. | |
| 5,728,645 | A | 3/1998 | Oshima et al. | |
| 6,201,945 | B1 * | 3/2001 | Schlueter et al. | 399/329 |
| 6,512,327 | B1 | 1/2003 | Yoon et al. | |
| 6,653,777 | B1 | 11/2003 | Onishi | |

FOREIGN PATENT DOCUMENTS

| | | |
|---|---|---|
| EP | 0 866 491 A2 | 3/1998 |
| JP | 63-102139 | 5/1988 |
| JP | 64-30134 | 2/1989 |
| JP | 3-49131 | 3/1991 |
| JP | 4-51423 | 2/1992 |

(Continued)

*Primary Examiner*—Edward J. Glick
*Assistant Examiner*—Anastasia S. Midkiff
(74) *Attorney, Agent, or Firm*—Oblon, Spivak, McClelland, Maier & Neustadt, P.C.

(57) ABSTRACT

A transfer film comprising a base film (11), a parting-agent layer (12), a protective film (13), and a metal film (14), the latter three being formed on the base film (11) in order, wherein the protective film (13) contains a softening agent such as a phosphate, an aliphatic monobasic acid ester, an aliphatic dibasic acid ester, or a dihydric alcohol ester. By using such a transfer film, a metal back layer is formed. Since the transfer layer of the transfer film has a surface resistivity of as high as $10^2$–$10^8$ Ω/, the surface resistivity of the formed metal back layer is high, and discharge is suppressed.

19 Claims, 10 Drawing Sheets

FOREIGN PATENT DOCUMENTS

| | | |
|---|---|---|
| JP | 5-190084 | 7/1993 |
| JP | 8-21320 | 3/1996 |
| JP | 9-283025 | 10/1997 |
| JP | 10-149108 | 6/1998 |
| JP | 10-326583 | 12/1998 |
| JP | 10-340693 | 12/1998 |
| JP | 2000-251804 | 9/2000 |
| KR | 1999-0033135 | 5/1999 |

* cited by examiner

TRANSFER FILM, METHOD FOR FORMING METAL BACK LAYER, AND DISPLAY DEVICE

REFERENCE TO PRIOR APPLICATIONS

The present application is a divisional of application Ser. No. 10/181,446, filed on Jul. 26, 2002, now U.S. Pat. No. 6,841,926, and in which the entire contents are incorporated herein by reference. Application Ser. No. 10/181,446 is a 35 U.S.C. § 371 of International Application No. PCT/JP01/00744, filed on Feb. 2, 2001.

TECHNICAL FIELD

The present invention relates to a transfer film, a method for forming a metal back layer of a phosphor screen by using the transfer film, and an display device having the metal back layer.

BACKGROUND ART

Conventionally, for the phosphor screen of a cathode ray tube (CRT), a field emission type display (FED) and the like, a metal back type structure in which a metal film is formed on the inner surface (surface opposite to a face plate) of a phosphor layer is adopted extensively. In the light emitted from a phosphor by the electrons discharged from an electron source, this metal back layer reflects the light, which advances toward the electron source, to the face plate side to improve luminance and to stabilize the potential of the phosphor layer. It also has a function to prevent the phosphor layer from being damaged by ions which are generated when the gas remaining in a vacuum envelop is ionized.

The metal back layer is conventionally formed by a method (lacquer method) in which a thin film of nitrocellulose is formed on the phosphor layer by a spin method, vacuum deposition of aluminum (Al) is preformed on it, and organic substances is baked and removed.

On the other hand, Japanese Patent Laid-Open Application Sho 63-102139 discloses as a simple method for forming a metal back layer a method (transfer method). In the transfer method, a metal-deposited film is formed on a film on which a parting agent is previously applied and transferred it onto the phosphor layer with an adhesive agent.

The method for forming a metal back layer by the transfer method, however, needs to secure a sufficient adhesive power to the phosphor layer and a baking resistance characteristic in the baking step. But, such characteristics were hardly realized at the same time and the transfer method was conventionally hard to put into actual use.

Specifically, it is necessary to adequately secure an adhesive power by increasing the thickness of the adhesive-agent layer in order to secure a good transfer property, but when the adhesive-agent layer is thick, it is necessary to decompose to scatter a large amount of organic substances in the next baking step. Therefore, the decomposition gas generated at this time causes destruction of the metal film such as a blister, and it is difficult to keep the baking resistance characteristic in good condition.

Japanese Patent Laid-Open Application Hei 3-49131, Japanese Patent Laid-Open Application Hei 4-51423 and Japanese Patent Laid-Open Application Hei 5-190084 disclose a method for remedying a defect resulting from the blister of the metal film in the transfer method by disposing fine pores on the metal film in order to release the decomposition gas. But, such methods had a disadvantage that a side effect was caused to deteriorate the optical reflection performance of the metal back layer.

Japanese Patent Laid-Open Application Sho 64-30134 discloses a structure in which an anchor layer comprising an acryl-based resin or the like is formed between a metal back layer and a parting-agent layer. But, this method is also hard to form a good metal film.

Besides, in the aforementioned lacquer method for forming a metal back layer a metal film is formed on a base surface having large projections and depressions by vacuum deposition, so that it is hard to form a thin film having high reflectance. Therefore, it was hard to obtain a phosphor screen having high luminance, and especially there was a problem of unevenness in luminance on the phosphor screen of the display such as the FED which operates in a low energy electron beam region.

Furthermore, the FED has a gap (space) of about one to several mm between the face plate having the phosphor screen and the rear plate having the electron-emitting element, and the gap cannot be increased in view of resolution and characteristics of a spacer. As a result, a high voltage of about 10 kV is applied to generate a strong electric field in the very small gap between the face plate and the rear plate, resulting in a problem that an electric discharge (dielectrical breakdown) tends to be caused. And, the occurrence of an electric discharge had a tendency of destroying or degrading the electron-emitting element or the phosphor screen.

The present invention has been completed to remedy the above problems, and it is an object of the invention to provide a transfer film capable of forming a metal back layer having good characteristics by a transfer method, a method for forming the metal back layer having remarkable advantageous effects efficiently by the transfer method, and a display device which has a high metal back effect and a remarkable withstand voltage characteristic and can make display with high luminance and high quality.

SUMMARY OF THE INVENTION

The transfer film according to a first aspect of the present invention is a transfer film, comprising a base film, a parting-agent layer, a protective film and a metal film, the parting-agent layer, the protective film and the metal film being stacked on the base film, wherein the protective film is mainly formed of a resin and contains at least one kind of softening agent selected from the group of phosphate, aliphatic monobasic ester, aliphatic dibasic ester, dihydric alcohol ester, oxyacid ester, butyl oleate, dibutyl adipate, paraffin chloride, toluenesulfonethylamide, toluenesulfonmethylamide, an aminobenzene sulfonamide compound, a sulfonamide compound, methyl abietate, dinonyl naphthalene, acetyl tributyl citrate, an aminotoluene sulfonamide compound and N-butyl benzene sulfonamide.

In the transfer film according to the first aspect, the softening agent is desirably contained in a range of 1 to 30% in a mass ratio against all materials configuring the protective film. It is desirable that the protective film has a thickness of 0.1 to 30 μm. Besides, it may be configured to have an adhesive-agent layer on the metal film. And, the adhesive agent can be mainly composed of at least one kind of resin selected from the group of a vinyl acetate resin, an ethylene-vinyl acetate copolymer, a styrene-acrylic acid resin, an ethylene-vinyl acetate-acrylic acid terpolymer, a vinyl chloride-vinyl acetate copolymer, a polybutene resin and a polyamide resin.

The transfer film of a second aspect of the invention is a transfer film comprising a base film, a parting-agent layer and a transfer layer, the parting-agent layer and the transfer layer being stacked on the base film, wherein the transfer layer includes a high resistance layer having a surface resistivity of $10^2$ to $10^8$ Ω/□. And, the transfer film of the second invention can be configured in such a way that the transfer layer includes a high resistance layer having a surface resistivity of $10^2$ to $10^8$ Ω/□ and a light reflection layer which is stacked thereon and has a surface resistivity of less than $10^2$ Ω/□.

The method for forming a metal back layer according to a third aspect of the invention comprises forming a phosphor layer on the inside surface of a face plate, transferring a metal film, the transferring including disposing the transfer film as set forth in the first aspect so to have the metal film come into contact with the phosphor layer through an adhesive-agent layer, pressing to adhere the transfer film onto the phosphor layer, and then peeling a base film of the transfer film, and heating the face plate which has the metal film transferred onto the phosphor layer.

The method for forming a metal back layer according to the third aspect of the invention can further comprise forming the adhesive-agent layer on at least one of the metal film of the transfer film and the phosphor layer before transferring the metal film.

The method for forming a metal back layer according to a fourth aspect of the present invention comprises forming a phosphor layer on the inside surface of a face plate, transferring a transfer layer, the transferring including disposing the transfer film as set forth in the second aspect so to have the transfer layer come into contact with the phosphor layer through an adhesive-agent layer, pressing to adhere the transfer film onto the phosphor layer, and then peeling a base film of the transfer film, and heating the face plate which has the transfer layer transferred onto the phosphor layer.

The method for forming a metal back layer according to a fifth aspect of the invention comprises forming a phosphor layer on the inside surface of a face plate, transferring a transfer layer, the transferring including disposing the transfer film as set forth in the second aspect configured additionally with said light reflection layer so to have the transfer layer come into contact with the phosphor layer through an adhesive-agent layer, pressing to adhere the transfer film onto the phosphor layer, and then peeling a base film of the transfer film, and heating the face plate which has the transfer layer transferred onto the phosphor layer.

The method for forming a metal back layer according to the fourth and fifth aspects of the invention can further comprises forming the adhesive-agent layer on at least one of the transfer layer of the transfer film and the phosphor layer before transferring the transfer layer.

The display device according to a sixth aspect of the present invention comprises a phosphor screen which has a metal back layer formed by the method for forming a metal back layer as set forth in the third aspect, the phosphor screen being disposed on the inside surface of a face plate. And, the display device of the sixth aspect of the invention can comprise an envelop having a rear plate and a face plate which is disposed to face the rear plate, many electron-emitting elements formed on the rear plate, and a phosphor layer which is formed on the face plate so to face the rear plate and emits light by an electronic beam emitted from the electron-emitting elements, wherein a phosphor screen which has a metal back layer formed by the method for forming a metal back layer as set forth in the third aspect, is disposed on the inside surface of the face plate.

The display device according to a seventh aspect of the present invention is an display device comprising a phosphor layer and a metal back layer which is formed on the phosphor layer, the phosphor layer and the metal back layer being disposed on the inside surface of a face plate, wherein the metal back layer has a high resistance layer having a surface resistivity of $10^3$ to $10^{10}$ Ω/□. And, in this display device, the metal back layer can have a light reflection layer having a surface resistivity of less than $10^3$ Ω/□ and a high resistance layer which is formed thereon and has a surface resistivity of $10^3$ to $10^{10}$ Ω/□.

The display device according to an eighth aspect of the present invention comprises a phosphor screen which has a metal back layer formed by the method for forming a metal back layer as set forth in the fourth aspect, the phosphor screen being disposed on the inside surface of a face plate as described in claim 18. The display device according to a ninth aspect of the invention comprises a phosphor screen which has a metal back layer formed by the method for forming a metal back layer as set forth in the fifth aspect, the phosphor screen being disposed on the inside surface of a face plate. And, the display device of the seventh and ninth aspects of the invention comprises a rear plate which is disposed to face the face plate, and a plurality of electron-emitting elements formed on the rear plate.

The present invention was achieved as a result of experiments made in detail on respective materials for the adhesive-agent layer and the protective film in connection with the formation of the metal back layer of the phosphor screen according to the transfer method. Details of the experiments are shown as follows.

First, only a blister phenomenon was conventionally considered in connection with a baking resistant property which was considered to be a necessary property. But, it was confirmed that it was necessary to additionally consider a crack property which was not considered heretofore. In other words, it is inevitable that three properties such as a transfer property, a blister property and a crack property are met in good balance when the metal back layer is formed by the transfer method. Typical defective and good patterns of the transferred and formed metal back layers are shown in FIG. 1. FIG. 1A shows a defective state of the transfer property, FIG. 1B shows a state of a blister defect, and FIG. 1c shows a state of a crack defect. FIG. 1D shows a conforming item.

A correlation among the three properties such as the transfer property, the blister property and the crack property will be explained with reference to the experiment results. It is conventionally known that the transfer property and the blister property are closely related to a thickness of the adhesive agent. Therefore, the metal back layer was produced by the conventional transfer type forming method, and the dependence of the transfer property and the blister property on the thickness of the adhesive agent was examined. The procedure is explained below.

First, a parting agent, which is composed of 75 parts (parts by mass; hereinafter referred to in the same way) of toluene, 12 parts of methyl isobutyl ketone, 12 parts of methyl ethyl ketone, 0.2 part of acetylene glycol, 0.2 part of waxes, 0.2 part of cellulose acetate, 0.2 part of rosin-based resin and 0.2 part of a silicone resin, was applied to a base film of polyester having a thickness of 20 μm by a gravure coater and dried to form a parting-agent layer having a thickness of 0.5 μm.

Then, a resin composition, which consists of 25 parts of methyl isobutyl ketone, 25 parts of methyl ethyl ketone, 6 parts of denatured alcohol, 10 parts of toluene, 10 parts of butyl acetate, 10 parts of ethyl acetate, 5 parts of a melamine resin, 5 parts of a urea resin, 1 part of a cellulose derivative, 1 part of a rosin-based resin, 1 part of dimethylsiloxane, 0.5 part of phosphoric acid, 0.5 part of p-toluenesulfonic acid, was applied to the parting-agent layer by the gravure coater and dried to form a protective film having a thickness of 1 μm. Aluminum was deposited on the protective film to form an aluminum film having a thickness of 50 nm. Then, a resin composition consisting of 90 parts of pure water and 10 parts of polyvinyl alcohol was coated to the aluminum film by the gravure coater and dried to form an adhesive-agent layer. The adhesive-agent layer was formed in ten or more kinds with a different thickness. Thus, the transfer films configured as described above were produced.

Next, a procedure of forming a phosphor screen will be described. First, a soda glass plate of 10 cm long, 10 cm wide and 3 mm thick was used as a face plate. A phosphor slurry consisting of 40 parts of $Y_2O_2S$:Eu, 50 parts of pure water, 1.4 parts of polyvinyl alcohol, 0.05 part of ammonium bichromate and 3 parts of a surface-active agent was applied to the face plate by a spin coater and dried. Then, entire exposure was performed with a mercury lamp at the intensity of ultraviolet rays of 0.5 mW/$cm^2$ for 30 seconds, and development was made with pure water. Thus, an extra slurry which was not cured by crosslinking was removed. Then, the obtained phosphor layer was dried to remove a water content. Test pieces of the phosphor screen were produced as described above.

The above transfer film was used to form a metal back layer on the test pieces by the transfer method.

Details of respective processes to form the metal back layer are shown in FIG. 2. The transfer film comprises a parting-agent layer 2, a protective film 3, a metal film 4 and an adhesive-agent layer 5 which are stacked on a base film 1 in order as shown in FIG. 2A. This transfer film 6 is adhered to a phosphor layer 8 under pressure by a rubber roller 7 as shown in FIG. 2B. The base film 1 is then peeled, and organic substances are decomposed and scattered in a baking step as shown in FIG. 2C. Thus, the metal back layer (metal film) 4 is completed as shown in FIG. 2D. In the drawings, reference numeral 9 denotes a face plate and 10 denotes a light shielding layer. To form a good metal back layer, it is important that transfer is uniformly made without unevenness in the transfer step shown in FIG. 2B and the metal film 4 is not damaged in the baking step shown in FIG. 2C.

Specifically, the adhesive-agent layer 5 of the transfer film was disposed to come into contact with the phosphor layer 8 of the test piece and adhered under pressure by the rubber roller 7 having hardness of 50 degrees and a surface temperature of 200° C. at a velocity of 2 m/min. and a pressing force of 300 kg/$cm^2$. The base film 1 was peeled at a velocity of 10 m/min. Thus, the metal film (aluminum film) 4 was transferred to the phosphor screen of the test piece.

Then, the test piece to which the aluminum film was transferred was heated (baked) to decompose and remove organic contents. As an oven temperature schedule, the temperature was increased from room temperature to 200° C. with a temperature gradient of 10° C./min., from 200° C. to 380° C. with a temperature gradient of 9° C./min., and from 380° C. to 450° C. with a temperature gradient of 3° C./min., and after heating at 450° C. for 30 minutes, the temperature was lowered to room temperature with a temperature gradient of 3° C./min. As described above, test samples on which the metal back layer was formed were prepared.

Next, test samples with these metal back layer were evaluated for the transfer property and the blister property as described below. First, grid lines were drawn at intervals of 5 mm×5 mm on a transparent plastic sheet. This sheet was used as an evaluation sheet. The evaluation sheet was placed on the test piece with the aluminum film transferred, and the number of grids (squares) on the test piece was counted. If a grid is partly on the test piece, it is counted only when a half or more of its area is on the test piece. Then, among the counted grids, the number of grids below which the aluminum film was fully transferred (100%) was counted. And, a ratio of the number of 100% aluminum-transferred grids to the total number of grids was used as a conforming item area rate in the metal film transfer step to evaluate the transfer property.

The same evaluation was performed after the heating treatment. A ratio of the number of grids, where a blister defect did not occur, to the number of 100% aluminum-transferred squares was used as a conforming item area rate in the heat treating step to evaluate the blister property. At this time, blister defect-occurred grids were counted regardless of the defect-occurred area. The results obtained by the above experiments and evaluations are shown in FIG. 3. In FIG. 3, (a) shows the transfer property, and (b1) shows the blister property.

It is seen in the drawing that adhesion to the phosphor layer is improved as the adhesive-agent layer becomes thicker, and the transfer property is improved, but a large amount of scattered gas is produced in the baking step, and blisters are produced. On the other hand, it is seen that when the adhesive-agent layer is thin, the blister property is improved, but the transfer property is degraded, and there is no region where the conforming item area rate becomes 100% in terms of both the transfer property and the blister property.

A method for forming fine pores in the metal film, which was a conventional blister property improving method, was tried according to the following procedure. First, a transfer film and a test piece were produced by the same procedure as above, and an aluminum film was transferred onto the phosphor layer. Then, sandpaper (#1000) was placed on the transferred aluminum film, and a fine pore producing treatment was performed by a rubber roller having hardness of 50 degrees and a surface temperature of 25° C. at a velocity of 2 m/min. and a pushing force of 10 kg/$cm^2$. At this time, test pieces undergone the treatment one and two times were produced respectively. Then, the same heating treatment was performed to produce a metal back layer.

And, evaluation was performed by the same method as above. In FIG. 3, (b2) and (b3) show the evaluated results of the blister property, (b2) showing a case that a fine pore treatment (fine pore producing treatment) was performed one time, and (b3) showing a case that the fine pore treatment was performed two times. The adhesive-agent layer on which blisters are produced becomes thicker as the number of fine pore forming treatments increases. It is seen that when the fine pore treatment is one time, the adhesive agent can be set to have such a thickness that a conforming item area rate becomes 100% for both the transfer property and the blister property in area A in the drawing, and when the fine pore treatment is performed two times, the film thickness is increased its range to areas A and B in the drawing, and workability is also extended.

Then, the metal back effect of the above test samples was evaluated by a simple method having the following procedure. First, a 30-cm cube was produced using an acrylic board. At that time, mat black paint was applied to the inside surface to form a pseudo nonreflective space in the cube.

Then, a hole having a diameter of 2 cm was formed at the center of one side of the cube to make a visible light reflectance evaluation box.

The test piece was disposed on the hole of the visible light reflectance evaluation box with its phosphor screen side face to the box. Then, an incandescent lamp was irradiated to the front of the face plate of the test piece at an angle of 45 degrees. Thus, the front of the face plate of the test piece which was placed on the hole of the visible light reflectance evaluation box was determined as a measurement face. And, the reflection luminance was measured from a position perpendicular to the measurement face, and visible light reflectance Rf (%) was obtained from the value of the measured reflection luminance through the following calculation.

$$Rf(\%)=(TRf/SRf)\times 100$$

In the above equation, Rf (%) denotes visible light reflectance, TRf denotes the reflection luminance of the test piece on which the metal back layer is formed, and SRf denotes the reflection luminance of the test piece having the phosphor layer only. The metal back effect is good as the Rf value is closer to 200, and it becomes smaller as the RF value becomes closer to 100.

The results obtained by evaluating the Rf values by the above method are shown in Table 1.

TABLE 1

| Fine pore Treatment | Thickness of adhesive-agent layer | Rf (%) |
|---|---|---|
| None | 25 μm | 190 |
| One time | 25 μm | 160 |
| Two times | 25 μm | 130 |

It is obvious from Table 1 that when the fine pore treatment is not performed, the Rf value is 190 and the metal back effect is considerably high. But, the Rf value becomes small as the number of the fine pore treatments increases. In other words, it is seen that the conforming item area rate becomes close to 100%, but the metal back effect is reduced by half.

The inventors focused attention on the point that the transfer property of the metal film and the phosphor layer can be improved depending on a kind of adhesive agent and examined various kinds of adhesive agents. As a result, the adhesive agents were classified into three groups depending on a difference in adhesive power. A first group of the adhesive agent is a group in that the metal film and the phosphor layer cannot be adhered regardless of the thickness thereof and includes those mainly consisting of a rosin-based resin, a terpene-based resin, a cyclopentadiene-based resin, a coumarone resin, an alkyd resin, an epoxy-based resin, a chlorinated polyolefin resin, a phenol resin, an acrylic silicone resin, a ketone resin or the like. A second group includes those which are low in adhesive power and need countermeasures against a blister defect, and mainly consist of polyvinyl alcohol, an EPDM (ethylene-propylene-diene terpolymer), neoprene phenol rubber, isoprene rubber, acrylonitrile rubber, nitrile phenol rubber, an isobutylene resin, a polybutene resin, butadiene-based rubber, a polyurethane resin, an acrylic ester resin, a polyester-based resin or the like. Besides, a third group includes adhesive agents which are high in adhesive power, good in transfer property even when the thickness is small and do not need to take measures against the blister defect. The third group includes those mainly consisting of a vinyl acetate resin, an ethylene-vinyl acetate copolymer, a styrene-acrylic acid resin, an ethylene-vinyl acetate-acrylic acid terpolymer resin, a polyvinyl chloride-vinyl acetate copolymer resin, a polybutene resin, a polyamide resin or the like.

As a typical example of the adhesive agents of the third group, a toluene solution of a vinyl acetate resin was used, and the transfer property and the blister property were shown in FIG. 4. The experiment and evaluation were performed in the same way as above excepting a kind of adhesive agent. In FIG. 4, (a) indicates the transfer property, and (b) indicates the blister property.

It is obvious from the drawing that a conforming item area rate of 100% was obtained in terms of both the transfer property and the blister property in a region where the adhesive agent had a thickness of 1 to 20 μm. But, when an adhesive agent of the second group which had a low adhesive power was used, the transfer property was insufficient, and there was another problem of a crack defect, which did not occur when an adhesive agent of the third group was used.

It was a damage caused on the metal film in the form of a crack at the time of the heating treatment. And, fine wrinkles produced at the pressing treatment and a difference in tension between the metal film and the phosphor layer after transferring are considered to be the causes of the occurrence. The crack property is shown in FIG. 4(*c*).

It is obvious from the drawing that the crack property becomes worse as the adhesive agent becomes thinner. When the crack property was added to the aforementioned (a) the transfer property and (b) the blister property to examine the performance of the transfer method, a conforming item area rate of the three properties became 100% in the area A of FIG. 4. It was possible to make the conforming item area rate of the three properties 100%, but because the thickness of the adhesive agent in which the conforming item area rate of the three properties was made 100% had a narrow range, a slight change in the thickness resulted in a defective or quality item, and workability was not good.

The inventors have repeated a devoted study to remedy the problem of the crack generation, and found as a result that it is effective to prevent the crack generation by disposing a protective film, which mainly consists of a resin, between the metal film and the parting-agent layer and contains at least one kind of softening agent selected from the group of phosphate, aliphatic monobasic acid ester, aliphatic dibasic acid ester, dihydric alcohol ester, oxyacid ester, butyl oleate, dibutyl adipate, paraffin chloride, toluenesulfonethylamide, toluenesulfonmethylamide, an aminobenzene sulfonamide, a sulfonamide compound, methyl abietate, dinonyl naphthalene, acetyl tributyl citrate, a toluidine sulfonamide compound and N-butyl benzene sulfonamide.

Flexibility of the protective film can be improved because the protective film contains the aforementioned softening agent. Thus, the flexibility of the protective film is improved, so that the followability of the phosphor screen to an uneven surface at the time of the transfer is improved, the occurrence of fine wrinkles in the metal film is prevented, and an unreasonable tension to be applied to the metal film is reduced. Further, the metal film does not follow to penetrate between the phosphor particles, and optical reflecting performance of the metal back layer is maintained.

Toluenesulfonethylamide was used as the softening agent and contained in a protective layer to test the crack property. The test results are shown in FIG. 5. As the adhesive agent, a toluene solution of the vinyl acetate resin of the aforementioned third group was used, and the test was conducted without changing the other conditions. In FIG. 5, (c1) shows a conforming item area rate (crack property) when the softening agent is contained by 0.5% (mass ratio) in the resin composition of the protective layer, (c2) shows a conforming item area rate when the softening agent is contained by 1% (mass ratio), (c3) shows a conforming item area rate when the softening agent is contained by 10% (mass ratio), and (c4) shows a conforming item area rate when the softening agent is contained by 30% to 40% (mass ratio). When the softening agent is added by 1% or more to the protective layer, the crack property is improved depending on the added amount, and its effect is saturated when it is added by 30%.

The transfer property and the blister property are shown in FIG. 6. In FIG. 6, (a1), (a2) and (a3) show the transfer property, and (b) shows the blister property. The transfer properties are indicated by (a1) which contains the softening agent by 0 to 20%, (a2) which contains the softening agent by 30%, and (a3) which contains the softening agent by 40% into the resin composition of the protective layer. When the softening agent is added in an amount more than 30%, the transfer property is considerably degraded.

From the above, it is desirable that the softening agent is added in a ratio of 1 to 30% against the resin composition of the protective layer, and the conforming item area rate can be made 100% in the region A in FIG. 5.

And, the metal back effects of these test specimens are shown in Table 2.

TABLE 2

| Fine pore treatment | Added amount of softening agent | Thickness of adhesive agent | Rf (%) |
|---|---|---|---|
| None | 0% | 16 μm | 190 |
| None | 1% | 8 μm | 190 |
| None | 10% | 2 μm | 190 |
| None | 30% | 2 μm | 190 |

It is obvious from Table 2 that even when the softening agent is added, the Rf values are not degraded but good at 190.

Thus, when the transfer film of the present invention is used, the conforming item area rate of 100% is completed in terms of the respective properties such as the transfer property, the blister property and the crack property, and a metal back layer can be formed with the thickness of the adhesive agent determined to have a wide range, good workability, and a high visual light reflection effect.

Besides, by making the transfer layer in the transfer film for forming the metal back to be a high resistance layer having a surface resistivity of $10^2$ to $10^8$ Ω/□, a metal back layer having a surface resistivity of $10^3$ to $10^{10}$ Ω/□ can be formed. And, an electric discharge can be suppressed so that the withstand voltage characteristic is improved remarkably without considerably lowering the brightness (luminance) of the phosphor screen. The aforementioned range of the surface resistivity was obtained as a result of the repeated experiments performed by the inventors on the relation between the surface resistivity of the metal back layer and the break-down voltage.

BRIEF DESCRIPTION OF THE DRAWINGS

FIG. 1 shows patterns of a metal back layer formed by a transfer method.

FIG. 2 shows an example of a method for forming a metal back layer by the transfer method.

FIG. 15 shows a method for forming a metal back layer on a face plate for a color cathode-ray tube by the transfer method in Embodiment 1.

BEST MODE FOR CARRYING OUT THE INVENTION

Preferred embodiments of the present invention will be explained. It is to be understood that the present invention is not limited to the following embodiments.

Figure 1A:
FIG. 1A is a photograph showing a defective state of a transfer property.
Figure 1B:
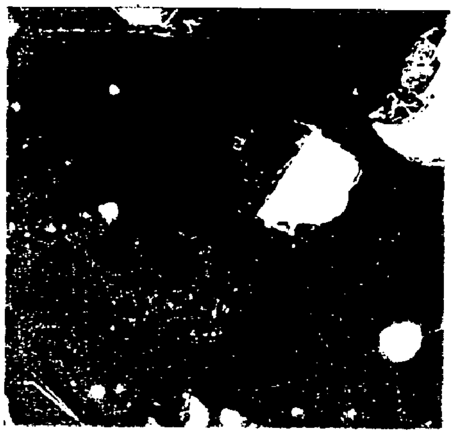
FIG. 1B is a photograph showing a state of a blister defect.
Figure 1C:
FIG. 1C is a photograph showing a state of a crack defect.
Figure 1D:
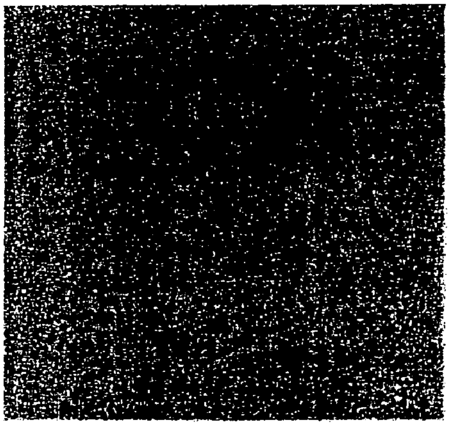
FIG. 1D is a photograph showing a conforming item.
Figure 2A:
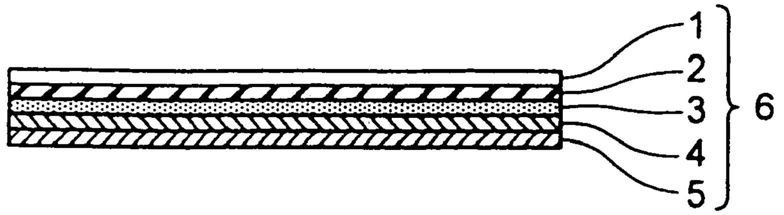
FIG. 2A is a sectional diagram of the transfer film.
Figure 2B:
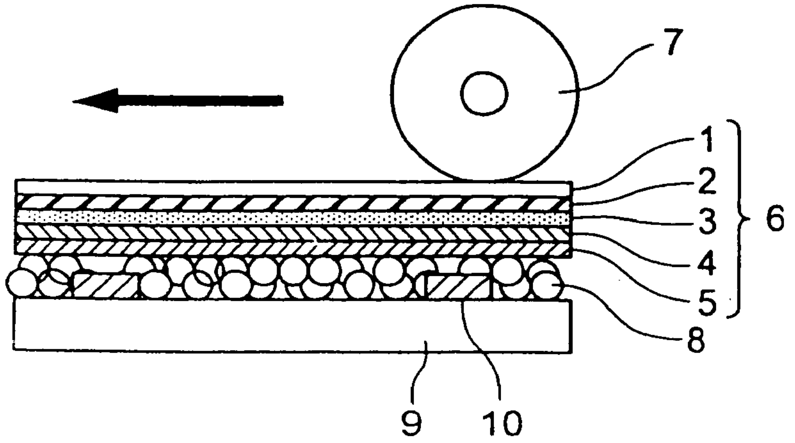
FIG. 2B is a sectional diagram showing a metal film transfer step.
Figure 2C:
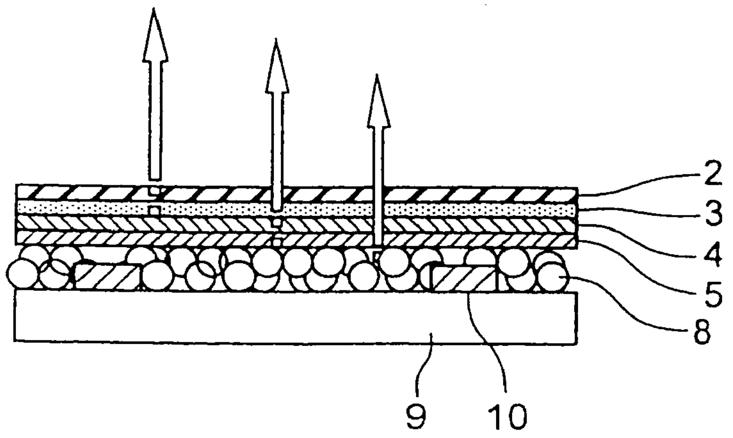
FIG. 2C is a sectional diagram showing a heat treating step.
Figure 2D:
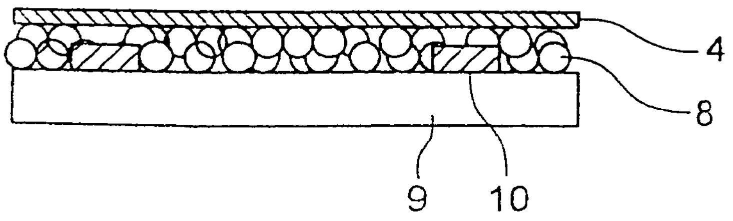
FIG. 2D is a sectional diagram showing a face plate on which a metal back layer is formed.
Figure 3:
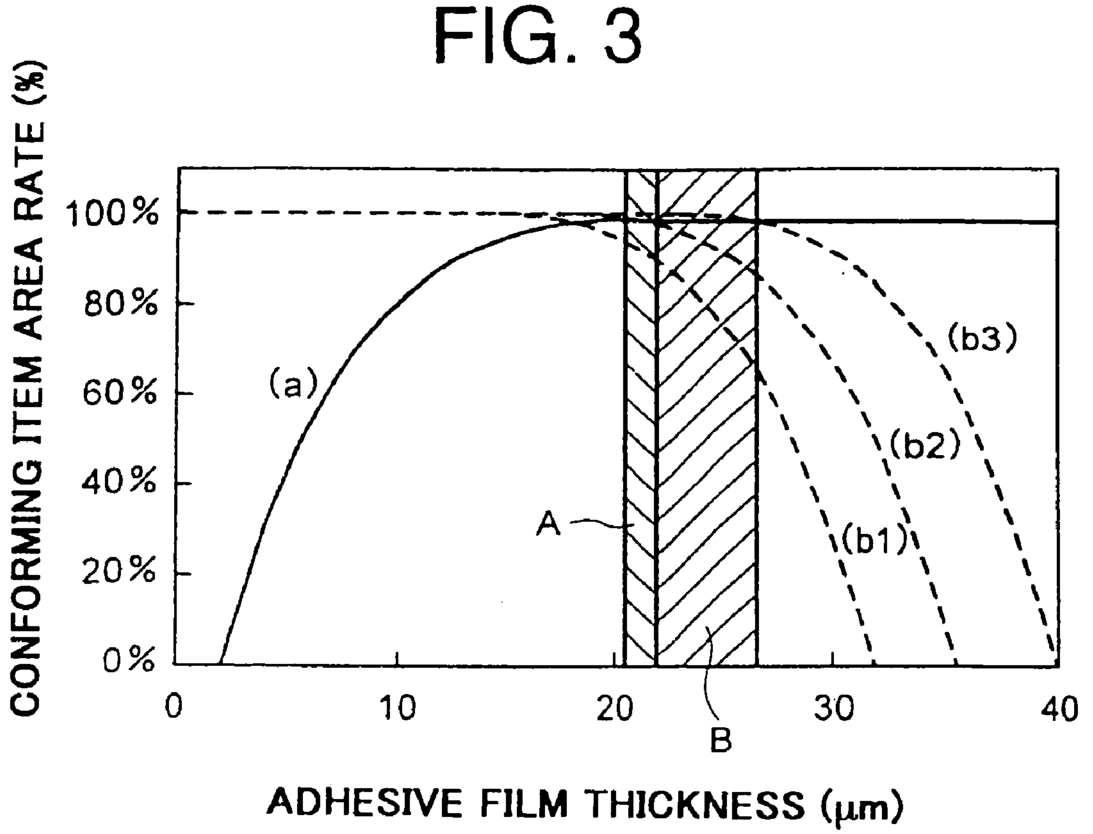
FIG. 3 is a graph showing a transfer property and a blister property of the metal back layer which is formed by a conventional transfer method.
Figure 4:
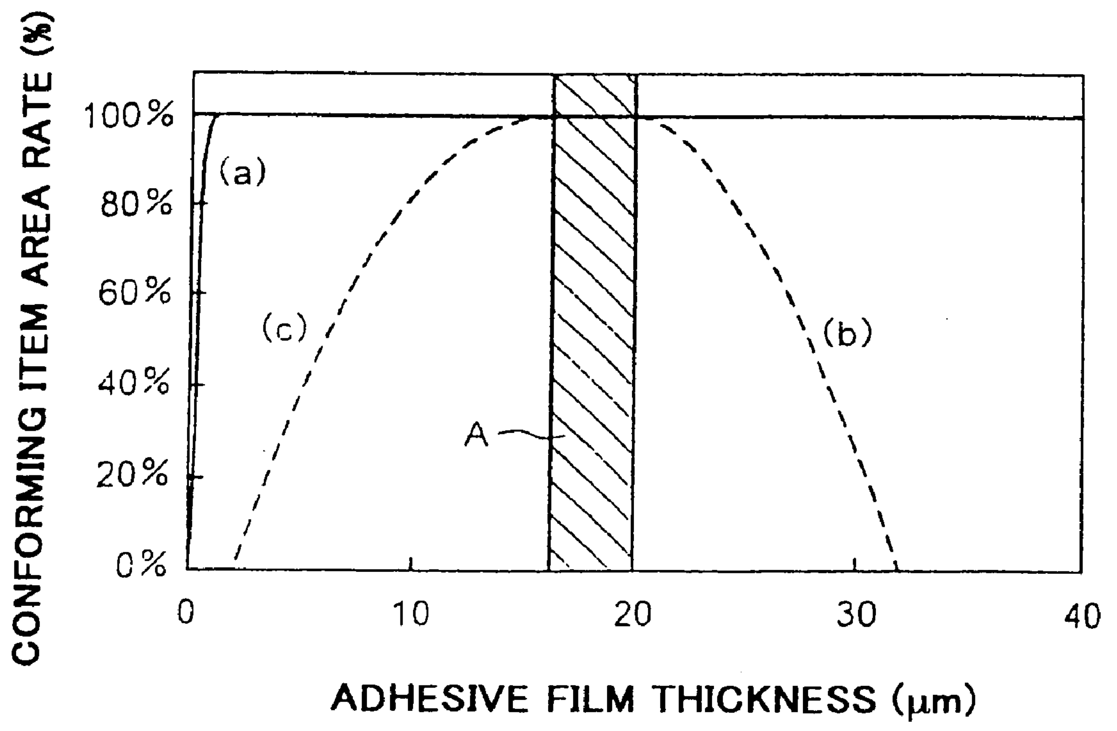
FIG. 4 is a graph showing a transfer property, a blister property and a crack property of the metal back layer which is formed by a transfer method using an adhesive agent having a high adhesive power.
Figure 5:
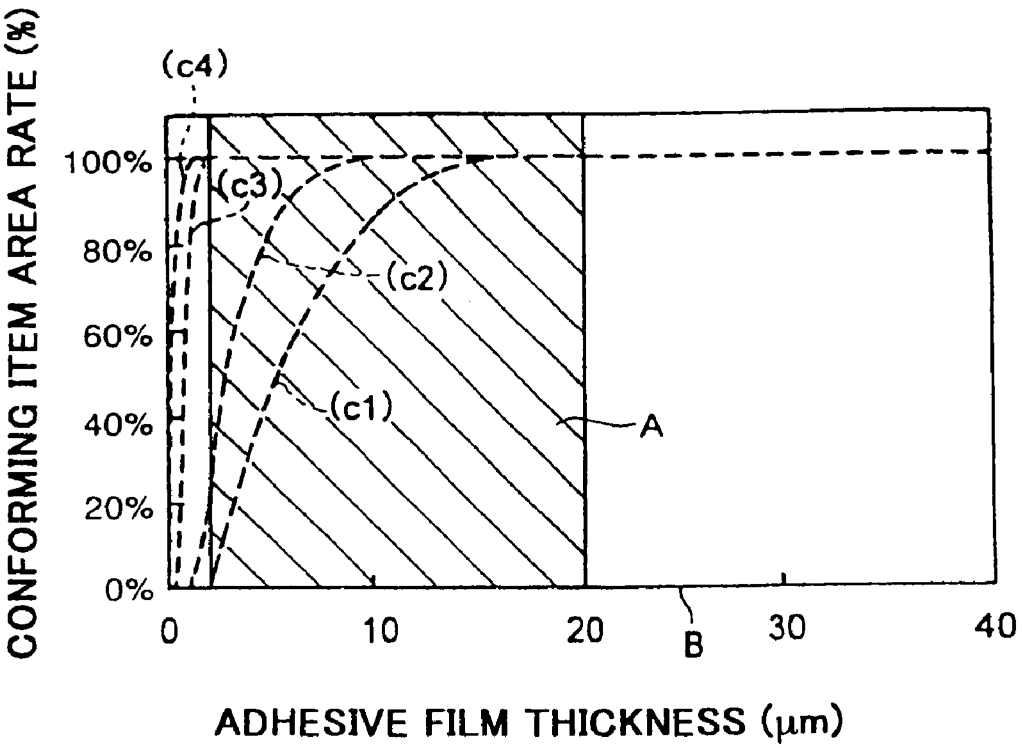
FIG. 5 is a graph showing a crack property of the metal back layer which is formed using a transfer film having a softening agent added to a protective layer.
Figure 6:
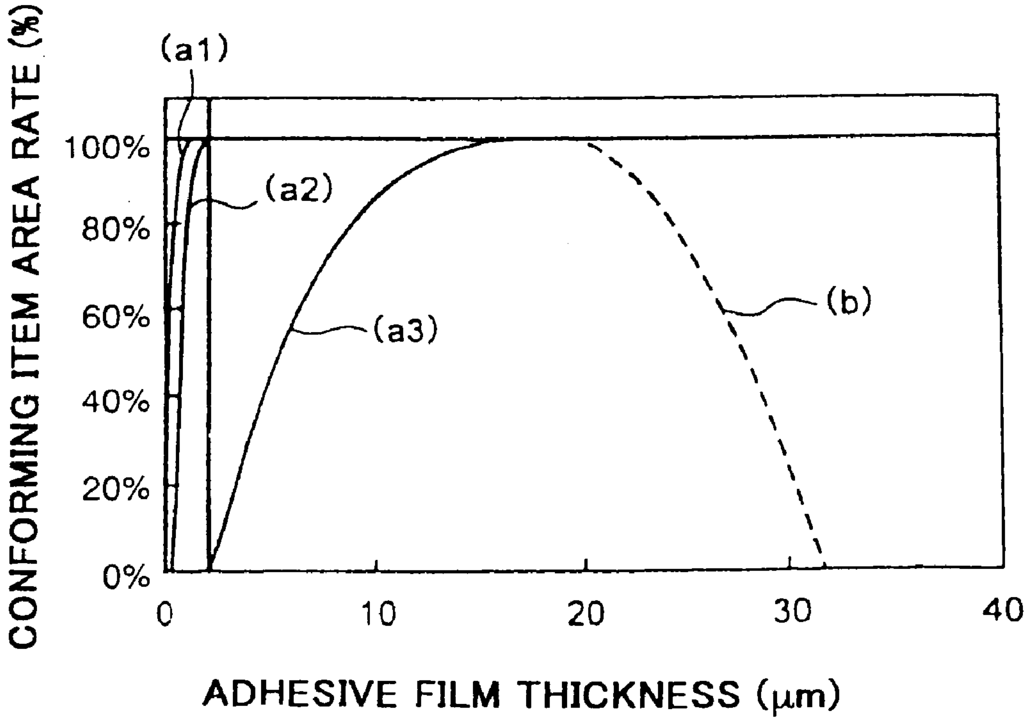
FIG. 6 is a graph showing a transfer property and a blister property of the metal back layer which is formed using a transfer film having a softening agent added to a protective layer.
Figure 7:
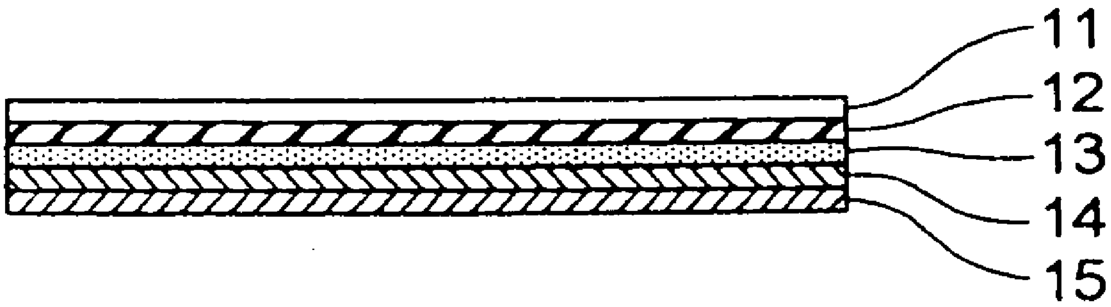
FIG. 7 is a sectional diagram showing a first embodiment of the transfer film of the present invention.

FIG. 7 is a sectional diagram showing the first embodiment of the transfer film of the invention. In the drawing, reference numeral 11 denotes a base film, on which a parting-agent layer 12, a protective film 13, a metal film 14 and an adhesive-agent layer 15 are stacked in order.

The base film 11 is not particularly limited but can be made of a resin selected from polyester (polyethylene terephthalate, polybutylene terephthalate), polyethylene, polypropylene, nylon (polyamide), cellophane, polycarbonate, polyacrylate, polyimide and aromatic polyamide which are generally used as a base film. This base film 11 desirably has a thickness of about 5 to 50 μm. If the base film 11 is excessively thin, deformation is excessive and wrinkles etc. are easily generated in the metal film 14 when the transfer film is under the pressing treatment. And, if it is excessively thick, followability for the base is deteriorated, and the transfer property is lowered.

As a parting agent, cellulose acetate, wax, fatty acid, fatty amid, fatty ester, rosin, acrylic resin, silicone, fluoroplastic or the like is used. Among them, a suitable one is appropriately selected depending on a peeling property between the base film 11 and the protective film 13. And, the parting-agent layer 12 is formed on the base film 11 by a gravure coater or the like and desirably have a thickness of 0.1 to 30 μm. It is not preferable that the parting-agent layer 12 is excessively thin because the peeling property lowers and that it is excessively thick because a film forming property of the protective film 13 is degraded.

For the protective film 13, a thermosetting resin, a thermoplastic resin, a photo-setting resin or the like is used as a base. Specifically, it is appropriately selected considering three properties such as a transfer property, a blister property and a crack property and a combination with an adhesive agent to be described later. For example, at least one kind of polymer, which is selected from an acrylic resin, a melamine resin, a urea resin, an acryl-melamine copolymer resin, a melamine-urea copolymer resin, a polyurethane resin, a polyester resin, an epoxy resin, an alkyd resin, a polyamide resin, celluloses, a vinyl-based resin, rubbers and the like, is used as base material.

To improve the crack property, a softening agent, which is selected from phosphate, aliphatic monobasic acid ester, aliphatic dibasic acid ester, dihydric alcohol ester, oxyacid ester, butyl oleate, dibutyl adipate, paraffin chloride, toluenesulfonethylamide, toluenesulfonmethylamide, an aminobenzene sulfonamide, a sulfonamide compound, methyl abietate, dinonyl naphthalene, acetyl tributyl citrate, a toluidine sulfonamide, N-butyl benzene sulfonamide and the like, is mixed in a ratio of 1 to 30% with respect to the protective film as the whole.

The protective film 13 is formed on the parting-agent layer 12 by a gravure coater or the like, and its thickness is desired to be about 0.1 to 30 μm. If the protective film 13 is excessively thin, the formed metal film 14 (metal back layer) has a degraded visible light reflecting performance, and if it is excessively thick, because a blister property is degraded.

The metal film 14 is appropriately selected from metals such as Al, Au and Ni and formed on the protective film 13 by vapor deposition. The metal film 14 is determined to have a thickness, which is generally about 10 to 200 nm, considering a dead voltage or the like in view of a usage phenomenon such as an anode voltage applied to the phosphor screen.

The adhesive agent is appropriately selected from those which are good in adhesion to both the phosphor layer and the metal film 14 considering a combination with the protective film 13, and those belonging to the aforementioned third group are desirably used. For example, an adhesive agent having as a main component a vinyl acetate resin, an ethylene-vinyl acetate copolymer, a styrene-acrylic acid resin, an ethylene-vinyl acetate-acrylic acid terpolymer, a vinyl chloride-vinyl acetate copolymer, a polybutene resin or a polyamide resin is available, and two or more kinds of resins may be used together. Additionally, to improve film quality other than the adhesive properties, a resin other than the aforementioned resins, a stabilizing agent, a filler and the like may be used together as required.

The adhesive-agent layer 15 is formed on the metal film 14 by a gravure coater or the like and desired to have a thickness of 1 to 20 μm. If the adhesive-agent layer 15 is excessively thin, the transfer property and the crack property are degraded, and if it is excessively thick, it is not preferable because the blister property is degraded. Besides, the adhesive-agent layer 15 can be disposed on the phosphor layer side instead of disposition on the transfer film side. It may also be disposed on both of the transfer film side and the phosphor layer side.

Then, an embodiment of forming the metal back layer using the transfer film configured as described above will be described.

First, the phosphor layer is formed on the face plate. Specifically, a ZnS-based, $Y_2O_3$-based or $Y_2O_2S$-based phosphor (average particle diameter of 4 to 15 μm) is applied to the face plate and dried by a slurry method, a spray method or a printing method, and patterned by photolithography if necessary to form the phosphor layer.

Then, the transfer film of the aforementioned embodiment is disposed on the phosphor layer in such a way that the adhesive-agent layer comes in contact with the phosphor layer, and a pressing process is performed. The pressing method includes a stamp method, a roller method and the like. As a material configuring the pressing portion, natural rubber, silicone rubber or the like of which hardness is adjustable is desirable, and its hardness is set to about 20 to 100 degrees. When pressing, heat may be applied, and a heating temperature can be about 40 to 250° C. in view of the resin or the like used for the transfer film. The pressing force is about 1 to 1000 kg/cm$^2$.

Then, the base film is peeled. The peel rate is not particularly limited, but it is not desirable if its peeling is not performed continuously because irregularity is caused in the transfer property. At this time, the adhesive-agent layer, the metal film, the protective film and the parting-agent layer partly remain on the phosphor screen. Then, the phosphor screen on which the metal film and the like are formed is baked by heating at a temperature of about 450° C. including the face plate to remove the remaining organic components. Through the above process, the phosphor screen with a good metal back layer is completed.

Figure 8:
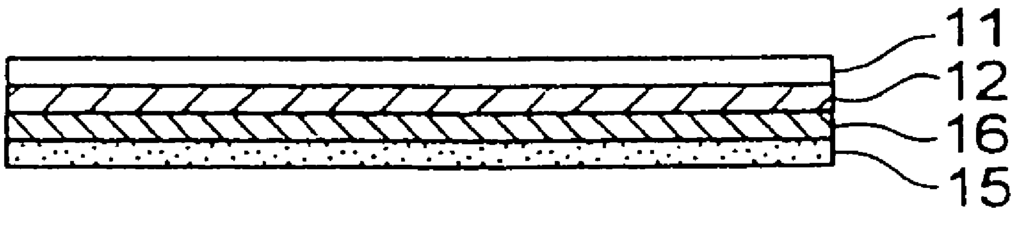
FIG. 8 is a sectional diagram showing a second embodiment of the transfer film of the present invention.

Then, a second embodiment of the transfer film according to the present invention will be explained. As shown in FIG. 8, the transfer film has the parting-agent layer 12 formed on the base film 11, a high resistance layer 16 having a surface resistivity of $10^2$ to $10^8$ Ω/□ and the adhesive-agent layer 15 are stacked on it. It may also be configured to have the protective film between the parting-agent layer 12 and the high resistance layer 16. The high resistance layer 16 is desired to have a thickness of 5 to 150 nm, and more preferably in a range of 10 to 100 nm.

The material for the high resistance layer 16 can be many kinds of inorganic materials such as aluminum oxide, silicon dioxide ($SiO_2$), AlN and TiN. The following method can be adopted to form the high resistance layer of an aluminum oxide in the transfer film.

Specifically, a degree of vacuum of about $1\times10^{-4}$ Pa is provided, and by depositing aluminum on the parting-agent layer or the protective film while introducing oxygen the high resistance layer can be formed.

Figure 9:
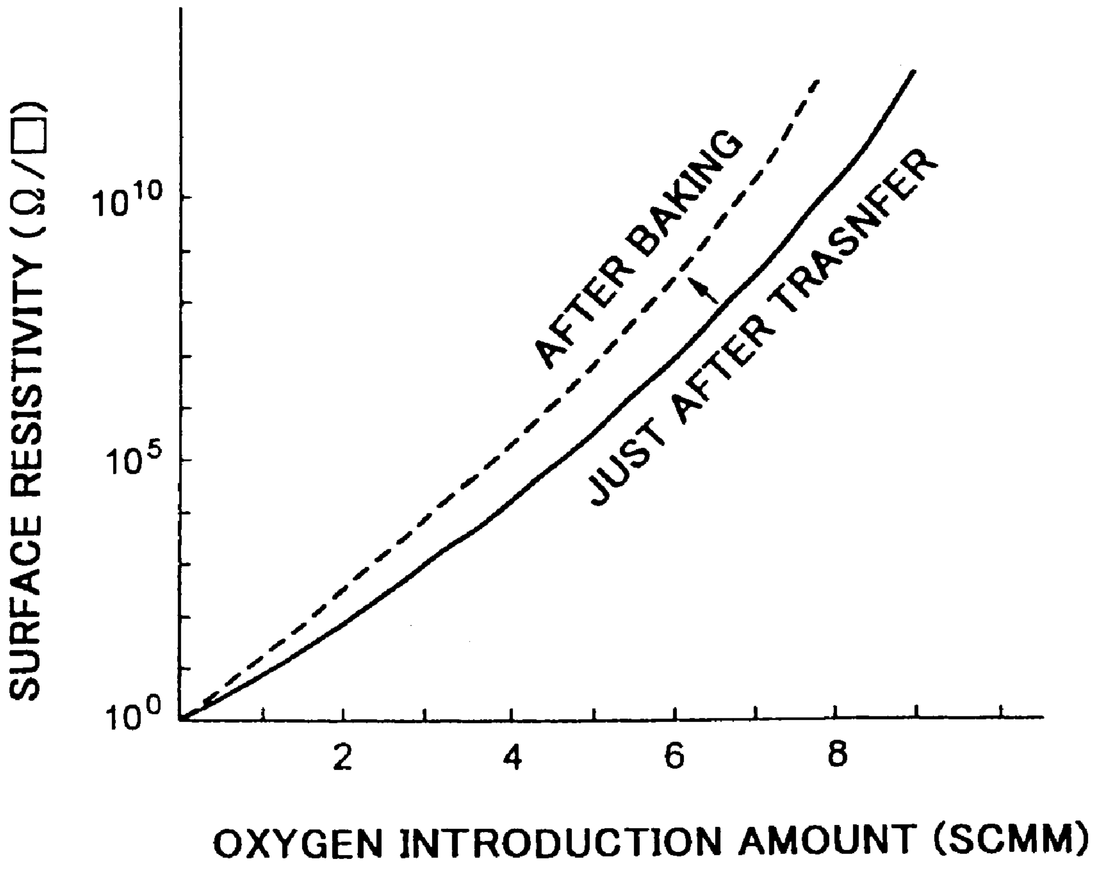
FIG. 9 is a graph showing a relation between an oxygen introduction amount and a surface resistivity at the time of vapor deposition in preparing the transfer film of the second embodiment.

Here, the surface resistivity of the high resistance layer formed can be controlled by adjusting an amount of the introduced oxygen at the time of the vapor deposition. When the inventors deposited aluminum with an amount of the oxygen introduced in 2 SCMM, 4SCMM and 6SCMM, there was formed a vapor-deposited film having a surface resistivity of $10^2$ Ω/□, $10^4$ Ω/□ and $10^6$ Ω/□. And, after forming it, the deposited film was further heated (baked) at a temperature of about 450° C., and it was found that oxidation was progressed to increase the surface resistivity by one to three digits. The test result is shown in FIG. 9 as a graph which shows a relation between the amount of introduced oxygen and the surface resistivity.

To form the high resistance layer of silicon dioxide ($SiO_2$), AlN or TiN in the transfer film, a method such as sputtering is generally adopted.

Figure 10:
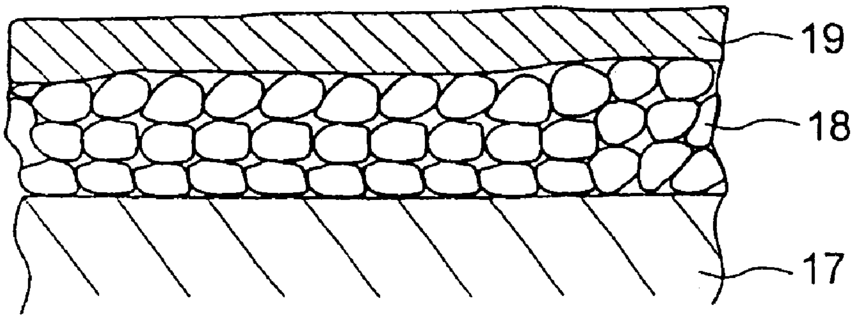
FIG. 10 is an enlarged sectional diagram schematically showing the structure of a phosphor screen having the metal back layer formed using the transfer film of the second embodiment.

Next, the metal back layer which is formed by using the transfer film having the above high resistance layer will be explained. FIG. 10 is a sectional diagram schematically showing an embodiment of the phosphor screen having the metal back layer formed. In the drawing, reference numeral 17 denotes a light transmission substrate such as a glass panel, 18 denotes a phosphor layer, and 19 denotes a metal back layer. The metal back layer 19 has a thickness of 5 to 150 nm and a surface resistivity of $10^3$ to $10^{10}$ Ω/□. The metal back layer 19 has reflectance of 40 to 95% in relative luminance with respect to reflectance of 100% of an ordinary aluminum film.

Figure 11:
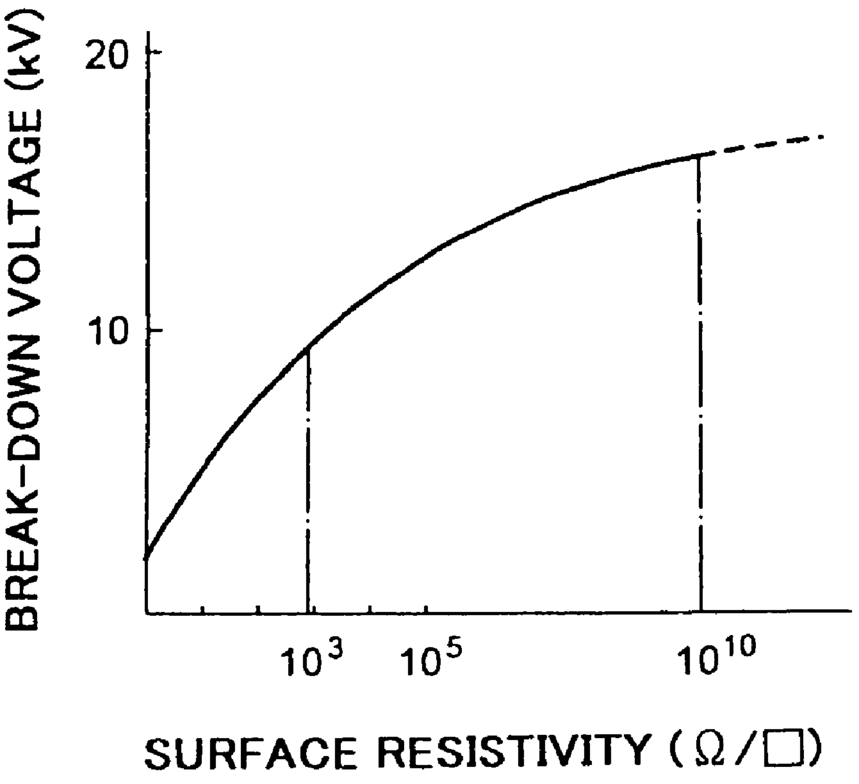
FIG. 11 is a graph showing a relation between a surface resistivity of the metal back layer and a break-down voltage of an FED.

FIG. 11 shows a relation between a surface resistivity and a break-down voltage of the metal back layer in the FED which was obtained by assembling the face plate having the above phosphor screen and a rear plate having electron-emitting elements with a substrate-to-substrate distance of 1 mm.

It is obvious from the graph that a remarkable discharge suppressor effect is produced when the metal back layer has a surface resistivity of $10^3$ Ω/□ or more, but when the surface resistivity exceeds $10^{10}$ Ω/□, the passage of a current becomes extremely difficult, and stable luminance cannot be obtained. The reason why the improvement of the withstand voltage characteristic is achieved is not necessarily clear, but a difference in quality of film is also considered relevant in addition to a discharge suppressing effect owing to the disposition of a high resistance layer.

Thus, in the FED having the aforementioned phosphor screen, the electrical discharge between the substrates is controlled, and the withstand voltage characteristic is improved. The metal back layer 19 having a high surface resistivity of $10^3$ to $10^{10}$ Ω/□ is formed by a transfer method, so that its light transmittance is not increased easily even if it is very thin, and it has high reflectiveness as compared with the metal back layer which is produced by a lacquer method or an emulsion method. And, it is particularly advantageous for a display of low voltage drive such as the FED.

Figure 12:
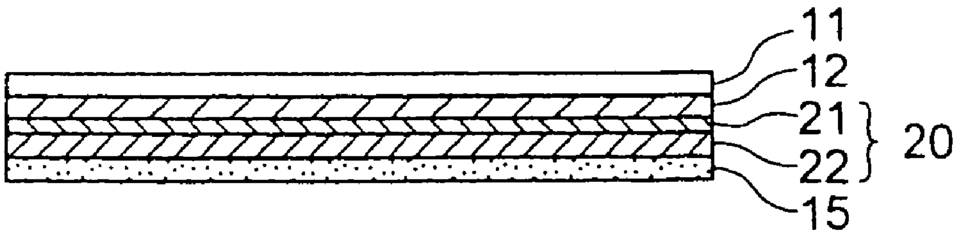
FIG. 12 is a sectional diagram showing a third embodiment of the transfer film of the present invention.

Next, a third embodiment of the transfer film according to the present invention will be explained. As shown in FIG. 12, in the transfer film, the parting-agent layer 12 is formed on the base film 11, and a transfer layer 20 for forming a metal back and the adhesive-agent layer 15 are stacked on it. The transfer layer 20 has a two-layer structure in which a low resistance layer 22 having a surface resistivity of less than $10^2$ Ω/□ and good reflectiveness is stacked on a high resistance layer 21 having a surface resistivity of $10^2$ to $10^8$ Ω/□. The transfer layer 20 having the above two-layer structure is desired to have a total thickness of 5 to 150 nm, and more preferably in a range of 10 to 100 nm.

Figure 13:
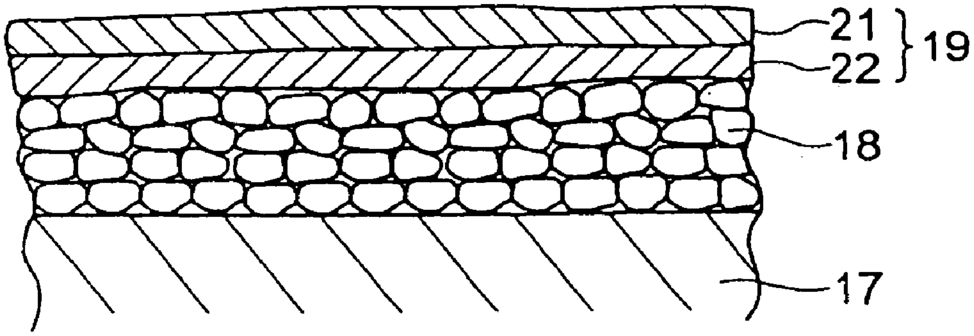
FIG. 13 is an enlarged sectional diagram schematically showing the structure of a phosphor screen having the metal back layer formed using the transfer film of the third embodiment.

The above transfer film is used to form a phosphor screen having a metal back as shown in FIG. 13. On this phosphor screen, the metal back layer 19, which is comprised of the low resistance layer 22 having a surface resistivity of less than $10^3$ Ω/□ and good reflectiveness and the high resistance layer 21 having a surface resistivity of $10^3$ to $10^{10}$ Ω/□ and stacked thereon, is formed on the phosphor layer 18. As to reflectance of the metal back layer 19, the low resistance layer 22 as the lower layer has 85 to 100% and the high resistance layer 21 as the upper layer has 20 to 90% in terms of relative luminance when the ordinary aluminum film has 100%.

Figure 14:
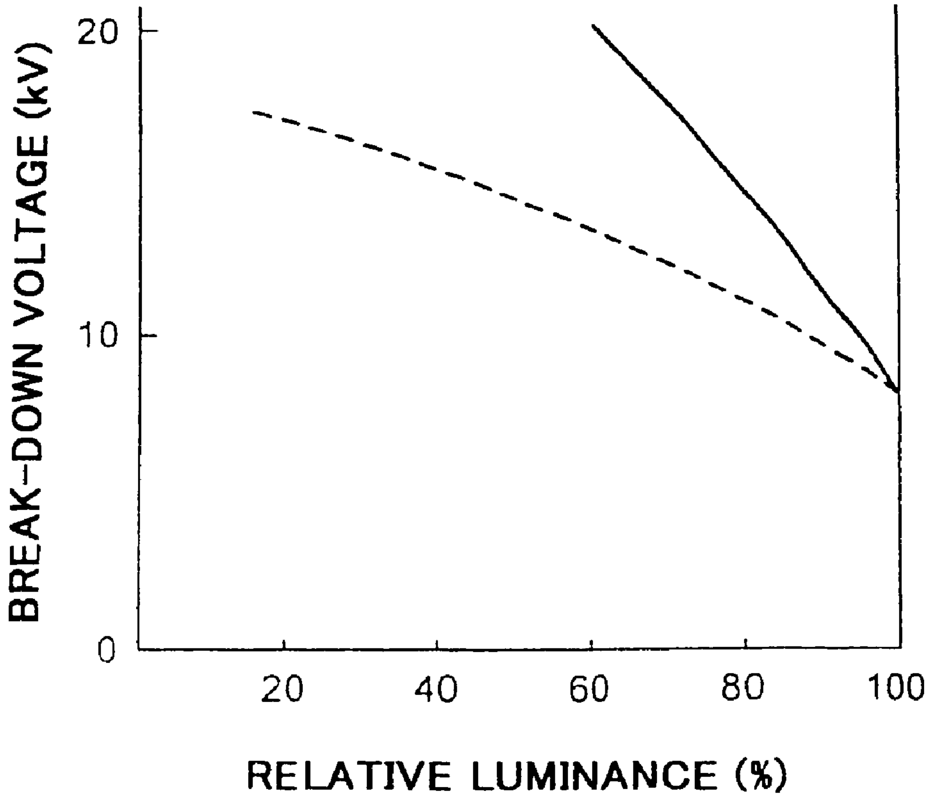
FIG. 14 is a graph showing a relation between relative luminance and a break-down voltage of the FED.

Then, FIG. 14 shows a relation between the relative luminance and the break-down voltage of the FED which is obtained by assembling the face plate having the above phosphor screen and the rear plate having the electron-emitting elements with a substrate-to-substrate distance of 1 mm. An FED which had the metal back layer 19 formed of only a high resistance layer with a surface resistivity of $10^3$ to $10^{10}$ Ω/□ was also determined for a relation between relative luminance and break-down voltage in the same way. And, the result is indicated by a broken line in the drawing.

It is obvious from the graph that in the FED having the metal back layer 19 with the two layer structure of the low resistance layer 22 and the high resistance layer 21, a discharge between the substrates is suppressed, a withstand voltage characteristic is improved, light reflectiveness of the metal back layer 19 is sufficiently secured, and high luminance is provided. On the other hand, in the FED having the metal back layer 19 formed of a high resistance layer only, the reflectiveness of the film lowers in inverse proportion to the rise of the surface resistivity, and luminance lowers.

Then, specific examples of applying the present invention to a display device will be described.

Embodiment 1

A transfer film was produced by the following procedure. A parting agent consisting of 75 parts of toluene, 12 parts of methyl isobutyl ketone, 12 parts of methyl ethyl ketone, 0.2 part of acetylene glycol, 0.2 part of waxes, 0.2 part of cellulose acetate, 0.2 part of a rosin-based resin and 0.2 part of a silicone resin was applied to a base film made of a polyester resin having a thickness of 20 μm by a gravure coater and dried to form a parting-agent layer having a thickness of 0.5 μm.

Then, a resin composition consisting of 25 parts of methyl isobutyl ketone, 25 parts of methyl ethyl ketone, 6 parts of denatured alcohol, 10 parts of toluene, 10 parts of butyl acetate, 10 parts of ethyl acetate, 5 parts of a melamine resin, 5 parts of a urea resin, 1 part of cellulose derivative, 1 part of a rosin-based resin, 1 part of dimethylsiloxane, 0.5 part of phosphoric acid and 0.5 part of p-toluenesulfonic acid was applied to the parting-agent layer by the gravure coater and dried to form a protective film having a thickness of 1 μm.

Then, aluminum was deposited on the protective film to form an aluminum film having a thickness of 100 nm, and a resin composition consisting of 90 parts of toluene and 10 parts of a polyvinyl acetate was applied to the aluminum film by the gravure coater and dried to form an adhesive-agent layer having a thickness of 12 μm. Thus, a transfer film was produced.

Figure 15A:
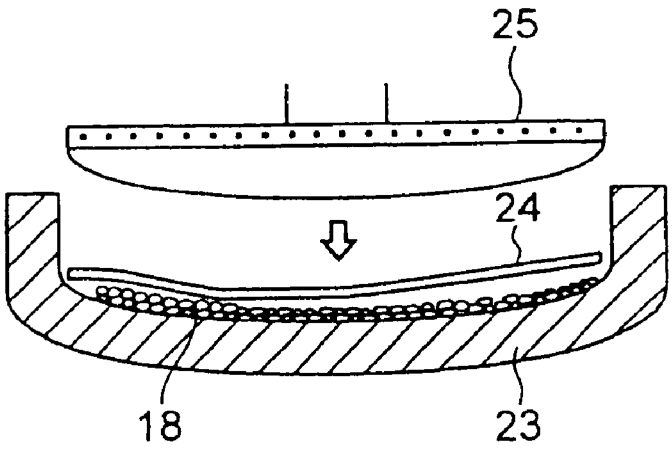
FIG. 15A is a sectional diagram showing a transfer step of a metal film.

Then, as shown in FIG. 15A, a stripe-patterned light shielding layer made of a black pigment was formed on the inner surface of a face plate 23 for a 32-inch color cathode-ray tube by photolithography, and a phosphor layer 18 having three colors of red (R), green (G) and blue (B) was formed between the light shielding section and the light shielding section of the light shielding layer in such a way that the respective colors were adjacent to one another in the form of a stripe.

Figure 15B:
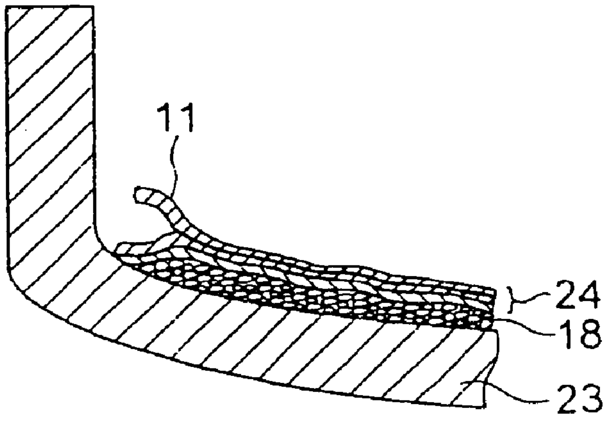
FIG. 15B is a sectional diagram showing a peeling step of a base film.

Then, the adhesive-agent layer of the transfer film 24 was disposed so to come into contact with the phosphor layer 18 and pressed in a direction of the arrow with a pressing force of 300 kg/cm$^2$ for a pressing time of 1 second by a rubber stamp 25 which had a shape conforming to the inner surface of the face plate 23, hardness of 50 degrees and a surface temperature of 200° C. Then, as shown in FIG. 15B, the base film 11 was peeled at a velocity of 10 m/min and the metal film (aluminum film) 14 was adhered to the phosphor layer 18 of the face plate 23.

Figure 15C:
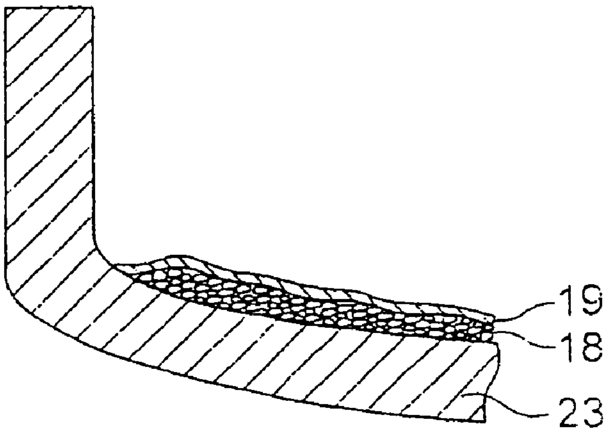
FIG. 15C is a sectional diagram of a face plate having the metal back layer formed.
Figure 16:
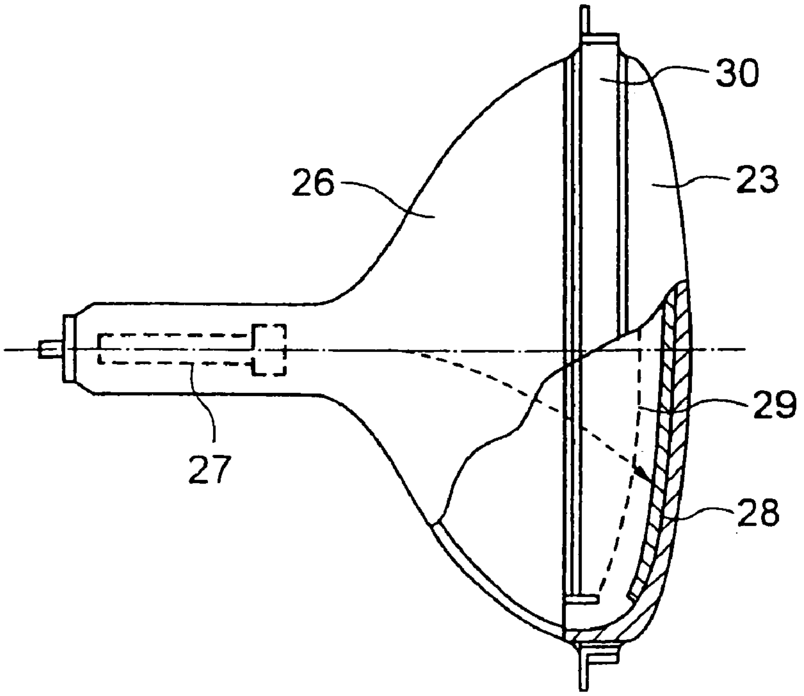
FIG. 16 is a sectional diagram of a color cathode-ray tube having the metal back layer formed by Embodiment 1.

Then, according to a well-known cathode-ray tube production process, the face plate and a funnel were connected, and organic components were decomposed and removed in a heat treating step at a peak temperature of about 450° C. at the time of connecting. Thus, the metal back layer 19 was formed as shown in FIG. 15C. Then, necessary processes such as sealing of an electron gun, discharge and mounting of an explosion-proof band are performed to complete a 32-inch color cathode-ray tube having the structure shown in FIG. 16. In the drawing, reference numeral 26 denotes the funnel, 27 denotes the electron gun, 28 denotes the light shielding layer, the phosphor layer and the metal back layer, 29 denotes a shadow mask, and 30 denotes the explosion-proof band.

When the metal back layer of the color cathode-ray tube was formed, a yield in the heating process was 90%, indicating a sufficiently practicable region. Details of defects resulting from the metal back layer include 4% of a blister defect and 5% of a crack defect, which resulted from variations in thickness of the adhesive-agent layer. Center luminance was measured with an acceleration voltage of 32 kV, a current density of 0.5 μA/cm$^2$ and an overall raster signal. Colors R, G and B indicated a high value of +20% as compared with a case of forming the metal back layer by a lacquer method, and there was obtained a good metal back effect.

Embodiment 2

First, a transfer film was produced according to the following procedure. A parting agent consisting of 75 parts of toluene, 12 parts of methyl isobutyl ketone, 12 parts of methyl ethyl ketone, 0.2 part of acetylene glycol and 0.2 part of a silicone resin was applied to a base film made of a polyester resin having a thickness of 20 μm by a gravure coater and dried to form a parting-agent layer having a thickness of 0.5 μm. Then, a resin composition consisting of 25 parts of methyl isobutyl ketone, 25 parts of methyl ethyl ketone, 6 parts of denatured alcohol, 10 parts of toluene, 10 parts of butyl acetate, 10 parts of ethyl acetate, 5 parts of a melamine resin, 5 parts of a urea resin, 1 part of a cellulose derivative, 1 part of a rosin-based resin, 1 part of dimethylsiloxane, 0.5 part of phosphoric acid, 0.5 part of p-toluenesulfonic acid and 2 parts of N-butyl benzene sulfonamide was applied to the parting-agent layer by the gravure coater and dried to form a protective film having a thickness of 1 μm.

Then, aluminum was deposited on the protective film to form an aluminum film having a thickness of 100 nm, and a resin composition consisting of 90 parts of toluene and 10 parts of a polyvinyl acetate was applied to the aluminum film by the gravure coater and dried to form an adhesive-agent layer having a thickness of 4 μm. The transfer film produced was used to complete a 32-inch color cathode-ray tube in the same way as in Embodiment 1.

In the production of the color cathode-ray tube, a yield in the heat treating step was 99%, indicating a good result. And, a defect resulting from the metal back layer did not occur. When center luminance was measured with an acceleration voltage of 32 kV, a current density of 0.5 μA/cm$^2$ and an overall raster signal, colors R, G and B indicated a high value of +20% as compared with a case of forming the metal back layer by the lacquer method, and there was obtained a good metal back effect.

Embodiment 3

In the same way as in Embodiment 2, a transfer film was produced except that the aluminum film had a thickness of 50 nm.

Then, a stripe-pattern light shielding layer made of a black pigment was formed on one side of a face plate for a 10-inch FED by a screen printing method. A phosphor layer having three colors red (R), green (G) and blue (B) was formed between the light shielding section and the light shielding section of the light shielding layer by the screen printing method in such a way that the respective colors were adjacent to one another in the form of a stripe.

Then, a transfer film was disposed so to have its adhesive-agent layer come into contact with the phosphor layer, pressed by a rubber roller having hardness of 50 degrees and a surface temperature of 200° C. at a velocity of 2 m/min. and a pressing force of 300 kg/cm$^2$. And the base film was peeled at a velocity of 10 m/min., to form an aluminum film on the phosphor layer of the face plate. Then, the face plate was raised from room temperature to 200° C. at a temperature gradient of 10° C./min., from 200° C. to 380° C. at a temperature gradient of 9° C./min., from 380° C. to 450° C. at a temperature gradient of 3° C./min. After heating at 450° C. for 30 minutes, the temperature was lowered to room temperature at a temperature gradient of 3° C./min. By the heating treatment, organic components were consumed from the respective resin layers, and the metal back layer was formed on the phosphor layer.

Figure 17:
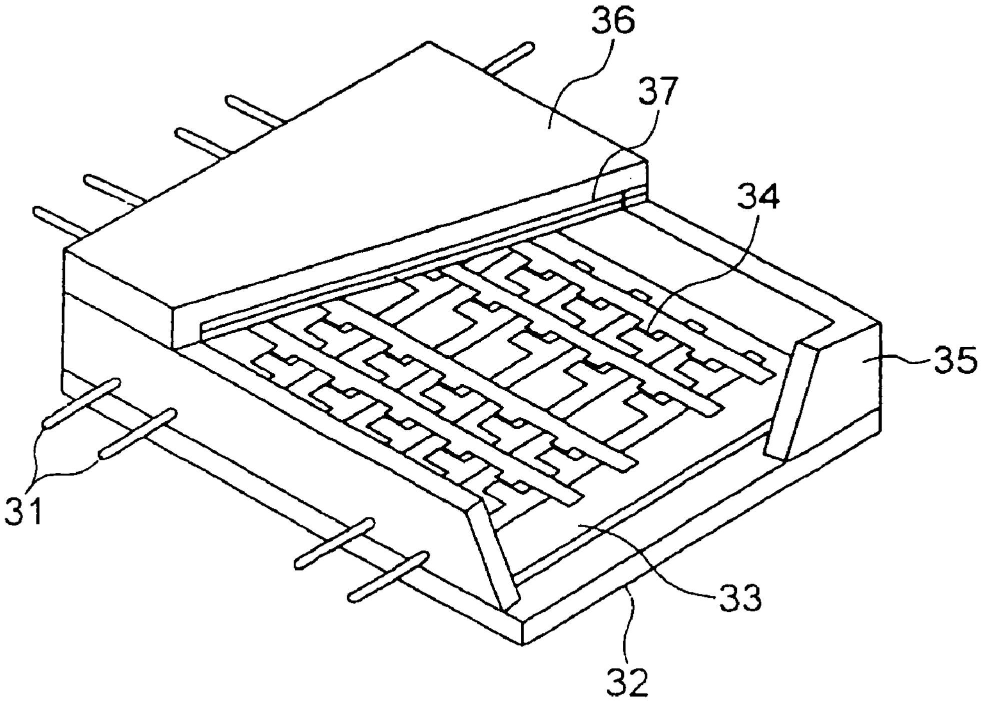
FIG. 17 is a sectional diagram of a color FED having the metal back layer which is formed by Embodiment 3.

Then, an electron generation source which had many surface conduction type electron-emitting elements formed in a matrix on a substrate was fixed on a rear plate. The rear plate was sealed to the face plate through a supporting frame with frit glass. Then, necessary processes such as discharging, sealing and the like were performed to complete a 10-inch color FED having the structure shown in FIG. 17. In the drawing, reference numeral 31 denotes high voltage terminals, 32 denotes the rear plate, 33 denotes the substrate, 34 denotes the surface conduction type electron-emitting elements, 35 denotes the supporting frame, 36 denotes the face plate, and 37 denotes the phosphor screen on which the metal back layer is formed.

In the formation of the metal back layer of the FED, a yield in the heat treating step was 99% indicating a good result. And, a defect resulting from the metal back layer did not occur. When center luminance was measured with an acceleration voltage of 5 kV, a current density of 20 μA/cm$^2$, and an overall raster signal, colors R, G and B indicated a high value of +50% with respect to the lacquer method, and there was obtained a good metal back effect.

Besides, unevenness in luminance was evaluated by the following method. Specifically, the display device section of the face plate was divided into 100 zones formed of 10 columns deep and 10 columns wide, and the respective zones were measured for white luminance with an acceleration voltage of 5 kV, a current density of 20 μA/cm$^2$ of the respective colors R, G and B, and an overall raster signal. And, the unevenness in luminance was evaluated in view of a standard deviation of the luminance values of the zones. As a result, a standard deviation (σ) was 30.5 when the metal back layer was formed by the lacquer method, but it was 2.6 in this example, indicating that the deviations of the luminance were substantially remedied. It is derived from the uniform thickness of the aluminum film, and for the display of a low voltage drive type such as the FED, it was proved that the formation of the metal back layer by the transfer method according to the present invention was especially effective.

Embodiment 4

First, a transfer film was produced according to the following procedure. A parting-agent layer mainly composed of a silicone resin and having a thickness of 0.5 μm was formed on a base film of a polyester resin having a thickness of 20 μm. And, a protective film mainly composed of a melamine resin and having a thickness of 1 μm was formed thereon.

Then, aluminum was deposited on the protective film to form an aluminum oxide film having a thickness of 70 nm. At this time, a degree of vacuum was increased to $1\times10^{-4}$ Pa, and aluminum was deposited while introducing oxygen at a rate of 4 SCCM. Thus, a high resistance layer having a surface resistivity of about $10^3$ Ω/□ was formed. Besides, an adhesive-agent layer mainly composed of a polyvinyl acetate or the like and having a thickness of 12 μm was formed to complete a transfer sheet.

Then, a stripe-patterned light shielding layer made of a black pigment was formed on one side of the face plate for the FED by a screen printing method, and a phosphor layer having three colors of red (R), green (G) and blue (B) was formed between the light shielding sections in a pattern of stripes so to adjacent to one another by the screen printing method.

Then, the transfer film was disposed to have an adhesive-agent layer come into contact with the phosphor layer, the high resistance layer was transferred in the same way as in Example 3, and heating was performed at 450° C. for 30 minutes. The surface resistivity of the high resistance layer, which was about $10^3$ Ω/□ immediately after the transfer, was increased by the heating process, and a metal back layer having a surface resistivity on the order of $10^5$ Ω/□ was formed.

Then, an electron generating source which had many surface conduction type electron-emitting elements formed in a matrix on a substrate was fixed on a rear plate. The rear plate and a face plate having the aforesaid metal back layer were disposed to face each other with a gap of about 1 mm between them and attached by sealing through a support frame with frit glass. Then, necessary processes such as discharging, sealing and the like were performed to complete a 10-inch color FED.

The FED obtained as described above was measured for center luminance by driving at an acceleration voltage of 5 kv, a current density of 20 μA/cm$^2$ and an overall raster signal. Relative luminance of 90% was indicated in comparison with a case that the metal back layer was formed of an ordinary aluminum film. A break-down voltage was increased from conventional 4 kv to 12 kV, and it was confirmed that a discharge was suppressed and withstand voltage characteristic was good.

Embodiment 5

First, a transfer film was prepared in the same way as in Embodiment 4. But, a transfer film for forming a metal back was formed as follows. Specifically, a degree of vacuum was increased to $1\times10^{-4}$ Pa and aluminum was deposited while introducing oxygen at a rate of 4 SCCM and a high resistance layer (thickness of 35 nm) having a surface resistivity of about $10^3$ Ω/□ on the protective film was formed. Then, aluminum was deposited under an ordinary condition, so that an aluminum film (thickness of 35 nm) having a surface resistivity of 10 Ω/□ or below on the high resistance layer was formed.

Then, the transfer film was used to complete a 10-inch color FED in the same way as in Embodiment 4. The obtained FED was operated with an acceleration voltage of 5 kV, a current density of 20 μA/cm$^2$ and an overall raster signal to measure center luminance. Relative luminance of 95% was indicated in comparison with a case that the metal back layer was an ordinary aluminum film, and it was found that the metal back layer obtained by this example had reflecting properties higher than in Embodiment 4. And, it was found that the break-down voltage was increased from conventional 4 kV to 12 kV, and it had the same high withstand voltage characteristic as in Embodiment 4.

INDUSTRIAL APPLICABILITY

As described above, the present invention can improve the transfer property and the baking resistance characteristic (particularly the crack property) when the metal back layer is formed by the transfer method. Thus, a good metal back layer can be obtained in good yield. The adhesive-agent layer to be formed on the transfer film or the like can also be determined to have a thickness in a wide range, and workability of forming the adhesive-agent layer is remarkable. And, the phosphor screen having the metal back layer formed with a high reflection effect and high luminance can be obtained. A discharge between the substrates is suppressed, and the withstand voltage characteristic is improved.

Besides, the step of forming the metal back layer is simple and easy, and the production cost of the display device can be reduced. Especially, the display device operated with a low voltage can obtain a display screen having good quality without unevenness in luminance.

What is claimed is:

1. A transfer film, comprising a base film, a parting-agent layer and a transfer layer, wherein the parting-agent layer enables peeling of the base film from the transfer film, and wherein the parting-agent layer and the transfer layer are stacked on the base film, and wherein the transfer layer includes a high resistance layer having a surface resistivity of $10^2$ to $10^8$ Ω/□ (square; the same is applied hereinafter) and a light reflection layer which is stacked thereon, and has a surface resistivity of less than $10^2$ Ω/□.

2. A method for forming a metal back layer, comprising:

forming a phosphor layer on the inside surface of a face plate;

transferring a transfer layer, the transferring including disposing a transfer film, the transfer film comprising a base film, a parting-agent layer and a transfer layer, wherein the parting-agent layer enables peeling of the base film from the transfer film, and wherein the parting-agent layer and the transfer layer are stacked on the base film, and wherein the transfer layer includes a high resistance layer having a surface resistivity of $10^2$ to $10^8$ Ω/□, so to have the transfer layer come into contact with the phosphor layer through an adhesive-agent layer, pressing to adhere the transfer film onto the phosphor layer, and then peeling a base film of the transfer film; and heating the face plate which has the transfer layer transferred onto the phosphor layer.

3. A method for forming a metal back layer, comprising:

forming a phosphor layer on the inside surface of a face plate;

transferring a transfer layer, the transferring including disposing the transfer film of claim 1, so to have the transfer layer come into contact with the phosphor layer through an adhesive-agent layer, pressing to adhere the transfer film onto the phosphor layer, and then peeling a base film of the transfer film; and heating the face plate which has the transfer layer transferred onto the phosphor layer.

4. The method of claim 2, further comprising, forming the adhesive-agent layer on at least one of the transfer layer of the transfer film and the phosphor layer, before transferring the transfer layer.

5. The method of claim 3, further comprising forming the adhesive-agent layer on at least one of the transfer layer of the transfer film and the phosphor layer, before transferring the transfer layer.

6. A display device, comprising a phosphor layer and a metal back layer which is formed on the phosphor layer, and wherein the phosphor layer and the metal back layer are disposed on the inside surface of a face plate, and wherein the metal back layer has a high resistance layer having a surface resistivity of $10^3$ to $10^{10}$ Ω/□.

7. The display device of claim 6, wherein the metal back layer has a light reflection layer having a surface resistivity of less than $10^3$ Ω/□, and a high resistance layer which is formed thereon, and has a surface resistivity of $10^3$ to $10^{10}$ Ω/□.

8. A display device, comprising a phosphor screen which has a metal back layer formed by the method of claim 2, and wherein the phosphor screen is disposed on the inside surface of a face plate.

9. A display device, comprising a phosphor screen, which has a metal back layer formed by the method of claim 3, and wherein the phosphor screen is disposed on the inside surface of a face plate.

10. The display device of claim 6, wherein a rear plate is disposed to face the face plate, and a plurality of electron-emitting elements are formed on the rear plate.

11. The display device of claim 7, wherein a rear plate is disposed to face the face plate, and a plurality of electron-emitting elements are formed on the rear plate.

12. The display device of claim 8, wherein a rear plate is disposed to face the face plate, and a plurality of electron-emitting elements are formed on the rear plate.

13. The display device of claim 9, wherein a rear plate is disposed to face the face plate, and a plurality of electron-emitting elements are formed on the rear plate.

14. The transfer film of claim 1, wherein the base film is made of a resin, selected from the group consisting of polyester, polyethylene, polypropylene, polyamide, cellophane, polycarbonate, polyacrylate, polyimide and aromatic polyamide.

15. The transfer film of claim 1, wherein the base film has a thickness of about 5–50 μm.

16. The transfer film of claim 1, wherein the parting-agent comprises a member selected from the group consisting of cellulose acetate, wax, fatty acid, fatty amid, fatty ester, rosin, acrylic resin, silicone and fluoroplastic.

17. The transfer film of claim 1, wherein the parting-agent has a thickness of 0.1–30 μm.

18. The method of claim 2, wherein the phosphor layer comprises a ZnS-based, a $Y_2O_3$-based, or a $Y_2O_2S$-based phosphor.

19. The method of claim 3, wherein the phosphor layer comprises a ZnS-based, a $Y_2O_3$-based, or a $Y_2O_2S$-based phosphor.

* * * * *